United States Patent
Barnes

(10) Patent No.: US 8,327,372 B1
(45) Date of Patent: *Dec. 4, 2012

(54) VIRTUALIZATION AND SERVER IMAGING SYSTEM FOR ALLOCATION OF COMPUTER HARDWARE AND SOFTWARE

(75) Inventor: James D. Barnes, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 914 days.

This patent is subject to a terminal disclaimer.

(21) Appl. No.: 12/389,087

(22) Filed: Feb. 19, 2009

Related U.S. Application Data

(63) Continuation of application No. 10/886,244, filed on Jul. 7, 2004, now Pat. No. 7,533,385.

(51) Int. Cl.
*G06F 9/46* (2006.01)
*G06F 9/455* (2006.01)

(52) U.S. Cl. .............................. 718/104; 718/1

(58) Field of Classification Search .............. 718/1, 104
See application file for complete search history.

(56) References Cited

U.S. PATENT DOCUMENTS

| | | | |
|---|---|---|---|
| 5,371,852 A | 12/1994 | Attanasio et al. | |
| 5,918,017 A | 6/1999 | Attanasio et al. | |
| 6,075,938 A | 6/2000 | Bugnion et al. | |
| 6,147,987 A | 11/2000 | Chau et al. | |
| 6,247,139 B1 | 6/2001 | Walker et al. | |
| 6,249,879 B1 | 6/2001 | Walker et al. | |
| 6,597,956 B1 * | 7/2003 | Aziz et al. | 700/3 |
| 7,054,943 B1 * | 5/2006 | Goldszmidt et al. | 709/229 |
| 7,533,385 B1 | 5/2009 | Barnes | |
| 2002/0069369 A1 * | 6/2002 | Tremain | 713/201 |
| 2002/0112132 A1 * | 8/2002 | Lesmanne et al. | 711/141 |
| 2003/0014524 A1 | 1/2003 | Tormasov | |
| 2003/0051021 A1 | 3/2003 | Hirschfeld et al. | |
| 2004/0015966 A1 | 1/2004 | MacChiano et al. | |

OTHER PUBLICATIONS

Dynamic Virtual Clusters in a Grid Site Manager Sprenkle et al., IEEE, 2003.*
The Design and Architecture of the Microsoft Cluster Service Vogels et al., IEEE, 1998.*
"Building Virtual Infrastructure with VMware VirtualCenter: Virtual Infrastructure Software for the Responsive Enterprise," VMware White Paper, 2004.
Buyya, R., et al, "Single System Image (SSI)," The International Journal of High Performance Computing Applications, vol. 15, No. 2, 2001.
Clarke, R. et al, "Cluster Operating Systems," School of Computer Science and Software Engineering, Monash University, Caulfield Campus, Melbourne, Australia, May 2000.
"Cluster Frame: The Single System Image Paradigm, " Qlusters, Dec. 5, 2003.
Day, B., "Recentralizing Server Sprawl Through Vmware: From Best Strategies to Cost Savings," Planning Assumption, Jun. 16, 2003.

(Continued)

*Primary Examiner* — Mengyao Zhe

(57) ABSTRACT

A system for improving resource utilization across a cluster of interconnected symmetric multiprocessor ("SMP") servers is provided. The system includes single system image ("SSI") software that represents the cluster of SMP servers as a single virtual SMP server and virtualization software that partitions the virtual SMP server into virtual servers. The system may also include virtual infrastructure management software that is used to partition the virtual SMP server into the virtual servers. A method for using SMP servers is further provided. The method includes representing the SMP servers as a virtual SMP server and partitioning the virtual SMP server into virtual servers. The method may also include allocating and reallocating processes across the physical SMP servers.

17 Claims, 1 Drawing Sheet

OTHER PUBLICATIONS

Ferri, R., et al, "Introducing the OpenSSI Project," Sys Admin, 2001.

"HRG Assessment: Compaq ProLiant Clusters running NonStop™ Clusters for SCO® UnixWare®software," Harvard Research Group, 1999.

"ProLiant clustering information center; Cluster basics" Hewlett-Packard Company.

Rajkumar, "Single System Image: Need, Approaches and Supporting HPC Systems," The 1997 International Conference on Parallel and Distributed Processing Techniques and Applications, USA, 1997.

"Server consolidation with Vmware Virtual Infrastructure and HP ProLiant technology; technology brief," Hewlett-Packard Company, 2004.

Trombly, M., "Virtualization Technology Offers Flexibility, Cost Savings. Part 1: Sun Makes Solaris More Useful for ASPs", 22321, Jan. 1, 2004.

Trombly, M., "Virtualization Technology Offers Flexibility, Cost Savings. Part 2: Vendors offer Linux Virtualization," 22322, Jan. 2, 2004.

"Twenty-to One Consolidation on Intel® Architecture: New Tools for Virtualization and Workload Management," Intel Solutions White Paper, Server Consolidation, Feb. 2003.

"VMware ESX Server 2: NUMA Support,"Vmware ESX Server, Jul. 2003.

Walker, B., "Open Single system Image (openSSI) Linux Cluster Project,".

* cited by examiner

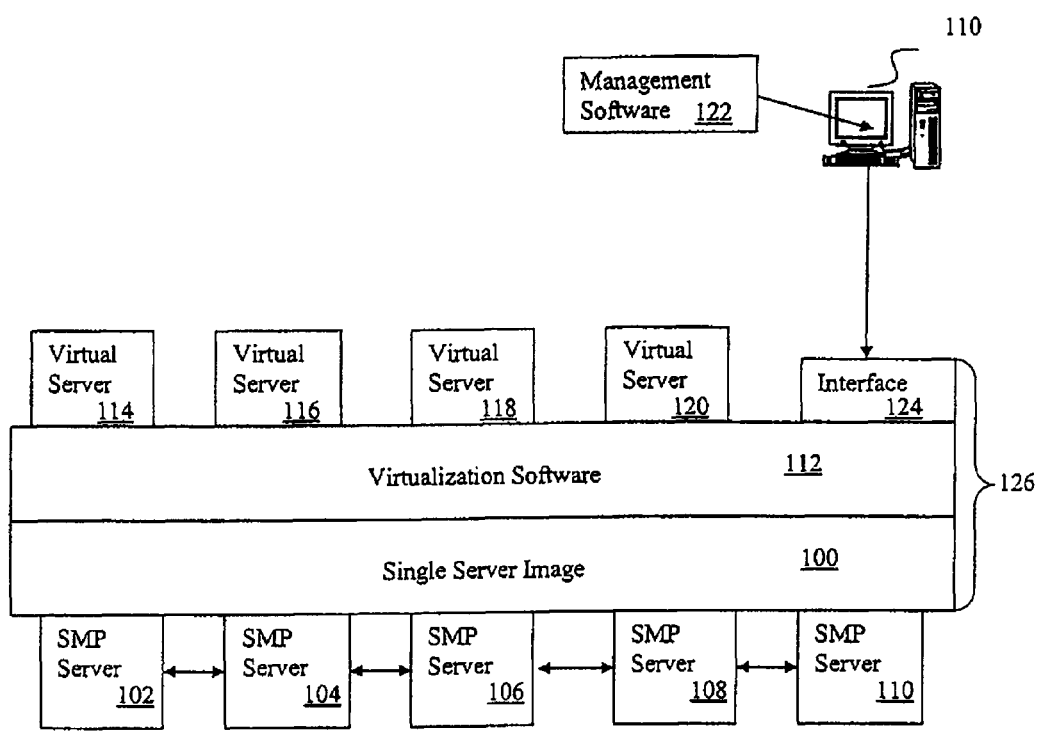

VIRTUALIZATION AND SERVER IMAGING SYSTEM FOR ALLOCATION OF COMPUTER HARDWARE AND SOFTWARE

CROSS-REFERENCE TO RELATED APPLICATIONS

This application is a continuation of and claims priority to U.S. patent application Ser. No. 10/886,244, now U.S. Pat. No. 7,533,385, entitled "Virtualization and Server Imaging System for Allocation of Computer Hardware and Software", filed on Jul. 7, 2004, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to virtualization and network server technology. More specifically, but not by way of limitation, a method and a system are provided that permit more effective resource utilization of network servers.

BACKGROUND OF THE INVENTION

Information technology ("IT") managers face a number of challenges as they are increasingly pushed to improve service delivery while lowering operational costs. These challenges include decreasing "server sprawl", improving system utilization, reducing system management complexity, and improving the flexibility of IT resources. To address these challenges, many IT organizations are implementing some form of server consolidation. This server consolidation can be "physical" as in the centralization of physical assets from geographically dispersed departments or data centers. The server consolidation can also be "logical" as in migrating multiple applications from dedicated servers onto a single symmetric multiprocessing ("SMP") server or onto a server cluster. Several approaches to providing the necessary software infrastructure for managing and executing the migrated applications on either an SMP server or a server cluster have emerged.

One widely-used approach to providing the software infrastructure needed to support the consolidation of multiple applications onto an SMP server is to apply virtual machine technology to create a virtualization infrastructure supporting the execution of multiple operating systems and their attendant applications. For consolidating multiple applications onto a server cluster, one approach to providing the required software infrastructure is to implement a single server image ("SSI") representation of the cluster.

While both of these approaches to providing a software infrastructure for server consolidation permit increased system flexibility and resource utilization, each also has its limitations. The virtualization infrastructure is typically limited to a single SMP server. Similarly, the operating systems and applications executing in the individual virtual machines will only share the resources available to the single SMP server. The single server image infrastructure, while permitting applications to share resources across the server cluster, is typically limited to a single operating system. In such a circumstance, applications not designed for that operating system cannot be consolidated on the server cluster without modification. In addition, applications running on such and infrastructure typically do not run in isolation, i.e. one application can adversely impact another application running on the infrastructure.

SUMMARY OF THE INVENTION

The present disclosure provides a system for improving resource utilization across a cluster of interconnected symmetric multiprocessor ("SMP") servers. The system includes single system image ("SSI") software that represents the cluster of SMP servers as a single virtual SMP server and virtualization software that partitions the virtual SMP server into virtual servers. The system may also include virtual infrastructure management software that is used to partition the virtual SMP server into the virtual servers.

In one embodiment, the present disclosure provides a method for using SMP servers. The method includes representing the SMP servers as a single virtual SMP server and partitioning the virtual SMP server into virtual servers. The method may also include dynamically allocating and reallocating system resources of the virtual SMP server across the virtual server responsive to changes in availability of the system resources.

In another embodiment, the present disclosure provides a system in which a cluster of SMP servers is managed as a single virtual SMP server and system resources of the virtual SMP server are dynamically allocated to virtual servers executing on a virtual infrastructure. The virtual infrastructure executes on the cluster of SMP servers.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

FIG. 1 is a diagram of a cluster of SMP servers with a combined single server image and virtualization infrastructure in accordance with an embodiment.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

When implementing a logical server consolidation program, IT managers are faced with decisions regarding the number and size of servers to be used. Tradeoffs are made between cost, throughput, and resource utilization. For example, a single large SMP server, e.g., a 16-way or 32-way server, may be able to support a significant portion of the applications to be consolidated, but such a server is very expensive. A cluster of smaller SMP servers, e.g., 2-way or 4-way servers, providing an equivalent number of processors and/or processing power could be used instead, which would cost much less than buying the one larger SMP server. However, any applications that are inherently non-clusterable would then need to be split among the individual servers which could potentially result in under-utilization of one or more of the multiple servers. Those non-clusterable applications requiring more processing power than is available on a single SMP server in the cluster would not be able to execute. What is needed is the ability to combine the smaller, less expensive SMP servers in such a way as to permit the consolidated applications to execute on the combined servers as if they were executing on an equivalent larger SMP server. Furthermore, the applications should be able to execute on this combined group of SMP servers without modification. The non-clusterable applications requiring more processing power would then be able to execute and there would be no need to allocate non-clusterable applications to a particular server.

Embodiments of the present disclosure provide a system and method for improving resource utilization across multiple interconnected SMP servers. More specifically, a software infrastructure is provided that represents multiple interconnected SMP servers as a single logical server, i.e., a single server image ("SSI"), and then permits this single logical server to be partitioned into multiple virtual servers. The system resources of the single logic server are dynamically allocated to the multiple virtual servers. Each of these virtual servers includes an operating system and a virtual machine. Applications designed for the operating systems executing on the virtual servers can then be executed on the virtual servers without modification. The virtual machines of the virtual servers are isolated so that errors or user actions that interfere with the operating of the OS and applications running on one virtual server have no effect on the continuing operation of other virtual servers.

FIG. 1 is a diagram of a cluster of interconnected SMP servers 102-110 with a combined single server image and virtualization infrastructure in accordance with an embodiment. Each of the SMP servers 102-110 is a fully functional server running an operating system kernel. While some devices may be shared among the SMP servers 102-110, each SMP server has its own physical memory (not specifically shown) and its own processors (not specifically shown). The SMP servers 102-110 are interconnected with a fast interconnect. In various embodiments, this interconnect may be implemented with any one of various available interconnects such as the Dolphin Scalable Coherent Interface ("SCI") interconnect, Myrinet™, InfiniBand™, or switched Gigabit Ethernet. InfiniBand™ is a trademark of the InfiniBand Trade Association. Myrinet™ is a trademark of Myricom, Inc.

While five SMP servers are illustrated, any number and any architecture of SMP server may be utilized. For example, in one embodiment, SMP server 102 may be a 2-way server while SMP servers 104 and 106 are 4-way servers and SMP server 110 is an 8-way server. Or, in another embodiment, all the SMP servers 102-110 may be 2-way servers.

The single server image ("SSI") software 100 and the virtualization software 112 interact to provide a virtual infrastructure 126 on top of the SMP servers 102-110. While the SSI software 100 and the virtualization software 112 are shown and discussed as separate layers, one of ordinary skill in the art can appreciate that the combined functionality may be implemented in many different ways.

The single server image ("SSI") software 100 enables the aggregation of a cluster of interconnected SMP servers 102-110 into a single virtual SMP server. In essence, the SSI software 100 manages the underlying servers 102-110 as if they were one large SMP server. The SSI infrastructure 100 implements a single entry point to the cluster, a single file hierarchy, a single control point, virtual networking, a single memory space, single job management, a single user interface, a single I/O space, a single process space, and process migration.

The SSI software 100 includes functionality to make file systems and devices (not specifically shown) accessible transparently across the cluster, regardless of which SMP server the hardware is actually attached to. In addition, the SSI software 100 includes functionality for cluster-wide resource allocation and sharing that can respond to resource availability, distribute the workload dynamically, and utilize the available cluster-wide resources efficiently and transparently. This functionality includes the ability to reallocate and reallocate executing processes across multiple physical SMP servers, preemptively and transparently. In one embodiment, the SSI software 100 includes dynamic load-balancing algorithms that continuously attempt to reduce the load differences between pairs of servers by reallocating processes from higher loaded to less loaded SMP servers. If new resources become available during the execution of processes, these load-balancing algorithms may utilize these new resources by reassigning the executing processes. Performance optimization techniques are applied to avoid allocating or reallocating the processes of any one application across physical SMP servers whenever possible so that no additional communication overhead is incurred. In an embodiment, the SSI infrastructure 100 is implemented as modifications and extensions to an existing server operating system.

The virtualization software 112 abstracts the hardware resources presented by the SSI software 100. In essence, the virtualization software 112 virtualizes the hardware resources presented by the SSI software 100 so that any combination of multiple heterogeneous and/or homogeneous operating systems can execute simultaneously, independently, and in isolation on the cluster of SMP servers 102-110. The virtualization software 112 includes functionality to logically partition the virtual SMP server provided by the SSI software 100 into multiple virtual servers 114-120. Each of the virtual servers 114-120 includes its own virtual machine with its own virtual resources and its own operating system ("OS"). While four virtual servers are shown, any number of virtual servers can be supported.

The operating systems of the virtual servers 114-120 may be heterogeneous. For example, virtual server 114 can be executing Windows® 2000, virtual servers 116 and 118 can be executing Windows NT®, and virtual server 120 can be executing Linux. Windows® and Windows NT® are registered trademarks of Microsoft Corporation.

The virtualization software 112 includes functionality to perform the necessary translations so that the operating systems can execute on the virtual SMP server. The virtualization software 112 also provides the ability to isolate one virtual machine from another. Each virtual machine includes a separate OS, registry applications, and data files. Because each OS is isolated, one OS cannot communicate with or leak data to any other OS, other than through networking mechanisms similar to those used to connect separate physical machines. Errors or user actions that interfere with the operating of the OS and applications running in one virtual machine have no effect on the continuing operation of other virtual machines.

Using the virtualization software 112, an administrator can create a virtual machine for each operating system to be executed on the virtual SMP server. The virtualization software 112 maps the resources of the virtual machines to the hardware resources of the virtual SMP server, so that an operating system running on a virtual machine executes as if it is accessing its own set of hardware resources, when in fact, the resources are shared among multiple virtual machines. When one of the virtual machines is idle, the other virtual machines on the virtual SMP server are able to use the free resources. Furthermore, each virtual machine is encapsulated so that user error, software failure, or complete shutdown of one of the virtual machines has no effect on the other virtual machines.

The virtual infrastructure management software 122 executing on a general purpose computer 110 connected to the cluster of SMP servers 102-110 through a network interface (not specifically shown) allows a system administrator to interact with the virtual infrastructure 126 to create and manage the virtual servers 114-120. This management software 122 operates through an interface 124 included in the virtual infrastructure 126. An administrator can use the management software 122 to create new virtual servers and guarantee specific amounts of processor cycles, real memory access, disk I/O and network bandwidth to that virtual server. The administrator can set a minimum amount and maximum amount of resources needed so that the virtual server is guaranteed the minimum amount of resources when it executes, but the SSI software 100 is made aware that the virtual server can potentially effectively use the specified maximum amount of resources if the resources are available. When a virtual server needs more or less resources due to changing application loads, the administrator can change the allocations. In addition, the administrator can manage the configurations of the various SMP servers 102-110 with the management software 122. The administrator can also use the management software 122 to add new SMP servers to the virtual SMP server or to remove SMP servers.

While several embodiments have been provided in the present disclosure, it should be understood that the present disclosure may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by on skilled in the art and could be made without departing from the spirit and scope disclosed herein.

What is claimed is:

1. A system, comprising:
    a plurality of interconnected symmetric multiprocessor ("SMP") servers;
    single system image ("SSI") software that represents and manages the plurality of SMP servers as a single virtual SMP server, wherein the single virtual SMP server comprises a single entry point to the plurality of SMP servers, a single file hierarchy, a single control point, a single memory space, single job management, and a single process space; and
    virtualization software that partitions the virtual SMP server into a plurality of virtual servers, wherein each virtual server of the plurality of virtual servers comprises a virtual machine and an operating system executable on the virtual machine, and wherein the virtualization software performs translations to execute the operating system on at least one of the plurality of virtual servers.

2. The system of claim 1, wherein each SMP server of the plurality of SMP servers executes an operating system kernel.

3. The system of claim 1, further comprising virtual infrastructure management software, wherein the virtual infrastructure management software is used to partition the virtual SMP server into the plurality of virtual servers.

4. The system of claim 1, wherein the SSI software dynamically allocates and reallocates processes of the plurality of virtual servers across the plurality of SMP servers responsive to changes in system resource availability.

5. The system of claim 1, wherein the SSI software automatically reallocates a process of a virtual server of the plurality of virtual servers from one SMP server of the plurality of SMP servers to another SMP server of the plurality of SMP servers responsive to a change in system resource availability.

6. The system of claim 1, wherein a virtual server of the plurality of virtual servers is guaranteed a minimum amount of system resources of the virtual SMP server.

7. The system of claim 1, wherein a virtual server of the plurality of virtual servers is given more system resources of the virtual SMP server if the virtual server can effectively use the additional system resources.

8. A method for using a plurality of symmetric multiprocessor ("SMP") servers comprising:
    representing and managing the plurality of SMP servers as a single virtual SMP server, wherein the single virtual SMP server comprises a single entry point to the plurality of SMP servers, a single file hierarchy, a single control point, a single memory space, single job management, and a single process space; and
    partitioning, by virtualization software, the virtual SMP server into a plurality of virtual servers, wherein each virtual server of the plurality of virtual servers comprises a virtual machine and an operating system executable on the virtual machine, and wherein the virtualization software performs translations to execute the operating system on at least one of the plurality of virtual servers.

9. The method of claim 8, wherein each SMP server of the plurality of SMP servers executes an operating system kernel.

10. The method of claim 8, further comprising:
    executing a process of a virtual server of the plurality of virtual servers on an SMP server of the plurality of SMP servers; and
    automatically reallocating the process to another SMP server of the plurality of SMP servers during execution responsive to a change in system resource availability.

11. The method of claim 8, further comprising:
    dynamically allocating and reallocating system resources of the virtual SMP server across the plurality of virtual servers responsive to changes in availability of the system resources.

12. A system, comprising:

a plurality of interconnected symmetric multiprocessor ("SMP") servers;

a virtual infrastructure that executes on the plurality of SMP servers, wherein the virtual infrastructure is provided in part by virtualization software; and a plurality of virtual servers that execute on the virtual infrastructure, wherein the virtual infrastructure manages the plurality of SMP servers as a single virtual SMP server and dynamically allocates and reallocates system resources of the virtual SMP server across the plurality of virtual servers;

wherein the single virtual SMP server comprises a single entry point to the plurality of SMP servers, a single file hierarchy, a single control point, a single memory space, single job management, and a single process space;

wherein each virtual server of the plurality of virtual servers comprises a virtual machine and an operating system executable on the virtual machine; and wherein the virtualization software performs translations to execute the operating system on at least one of the plurality of virtual servers.

13. The system of claim 12, wherein each SMP server of the plurality of SMP servers executes an operating system kernel.

14. The system of claim 12, wherein the virtual infrastructure automatically reallocates a process of a virtual server of the plurality of virtual servers from one SMP server of the plurality of SMP servers to another SMP server of the plurality of SMP servers responsive to a change in availability of the system resources.

15. The system of claim 12, wherein the virtual infrastructure provides a virtual server of the plurality of virtual servers a minimum amount of system resources of the virtual SMP server.

16. The system of claim 12, wherein the virtual infrastructure provides a virtual server of the plurality of virtual servers more system resources of the virtual SMP server if the virtual server can effectively use the additional system resources.

17. The system of claim 12, wherein a virtual server of the plurality of virtual servers is defined to require a minimum amount of system resources of the virtual SMP server and a maximum amount of system resources of the virtual SMP server, and wherein the virtual infrastructure guarantees the minimum amount of system resources to the virtual server during execution and provides additional system resources to the virtual server up to the maximum amount if additional system resources are available.

* * * * *